US009615324B2

United States Patent
Gresset et al.

(10) Patent No.: US 9,615,324 B2
(45) Date of Patent: Apr. 4, 2017

(54) METHOD FOR SETTING, IN A WIRELESS CELLULAR TELECOMMUNICATION NETWORK, THE POWER OF THE RADIO SIGNALS TRANSFERRED IN CELLS

(75) Inventors: Nicolas Gresset, Rennes (FR); Mourad Khanfouci, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 128 days.

(21) Appl. No.: 14/005,378

(22) PCT Filed: Mar. 12, 2012

(86) PCT No.: PCT/EP2012/054246
§ 371 (c)(1),
(2), (4) Date: Nov. 11, 2013

(87) PCT Pub. No.: WO2012/123399
PCT Pub. Date: Sep. 20, 2012

(65) Prior Publication Data
US 2014/0056196 A1    Feb. 27, 2014

(30) Foreign Application Priority Data

Mar. 17, 2011   (EP) .................................... 11158737

(51) Int. Cl.
*G08C 17/00*   (2006.01)
*H04B 7/00*   (2006.01)
(Continued)

(52) U.S. Cl.
CPC ........... *H04W 52/02* (2013.01); *H04W 52/40* (2013.01); *H04W 52/46* (2013.01); *H04W 52/242* (2013.01)

(58) Field of Classification Search
CPC ... H04W 52/02; H04W 52/40; H04W 52/242; H04W 52/46
See application file for complete search history.

(56) References Cited

U.S. PATENT DOCUMENTS

| 8,559,663 | B1 * | 10/2013 | Sacha et al. ................... | 381/315 |
| 2008/0188260 | A1 * | 8/2008 | Xiao et al. ..................... | 455/522 |

(Continued)

OTHER PUBLICATIONS

Written Opinion of the International Searching Authority Issued in PCT/EP12/54246 Filed Mar. 12, 2012.

(Continued)

*Primary Examiner* — Lonnie Sweet
(74) *Attorney, Agent, or Firm* — Oblon, McClelland, Maier & Neustadt, L.L.P.

(57) ABSTRACT

A method for setting power of radio signals transferred by a node and/or of the radio signals transferred by mobile terminals served by the node. The node: receives, from at least one neighbouring node, at least one parameter value used by the neighbouring node for setting the power of the radio signals transferred by the neighbouring node and/or of the radio signals transferred by mobile terminals served by the neighbouring node, determines, at least from the parameter value, a parameter value to be used by the node, sets the power of the radio signals transferred by the node and/or the power correction of the radio signals transferred by mobile terminals served by the node according to the determined parameter value, and transfers at least the determined parameter value to the at least one neighbouring node.

12 Claims, 4 Drawing Sheets

(51) Int. Cl.
*H04W 52/02* (2009.01)
*H04W 52/40* (2009.01)
*H04W 52/46* (2009.01)
*H04W 52/24* (2009.01)

(56) References Cited

U.S. PATENT DOCUMENTS

| | | |
|---|---|---|
| 2010/0195619 A1 | 8/2010 | Bonneville et al. |
| 2010/0197338 A1 | 8/2010 | Bonneville et al. |
| 2011/0151907 A1* | 6/2011 | Oh .................... H04W 72/0426 455/501 |
| 2011/0201369 A1* | 8/2011 | Kim et al. .................... 455/507 |

OTHER PUBLICATIONS

International Search Report Issued May 25, 2012 in PCT/EP12/54246 Filed Mar. 12, 2012.

* cited by examiner

METHOD FOR SETTING, IN A WIRELESS CELLULAR TELECOMMUNICATION NETWORK, THE POWER OF THE RADIO SIGNALS TRANSFERRED IN CELLS

The present invention relates generally to a method and a device for setting the power of the signals transferred by a node through a wireless interface and/or transferred by mobile terminals served by the node.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e. too many system resources for a mobile terminal located in a building, if the signals radiated by the base stations and/or by the mobile terminal are too attenuated.

Solutions are proposed today. Particular base stations which are not necessarily deployed by the operator and thus not following a given planning, like femto base stations or pico base stations or relays named hereinafter home base stations, are largely deployed and may provide coverage areas within the buildings and base station offload. Relays may also provide outdoor coverage extension.

Base stations and home base stations are nodes of the wireless cellular telecommunication network.

Such massive deployment of home base stations increases the overall electric power consumption of the wireless cellular telecommunication network.

Today, electric power saving becomes then a main issue for wireless cellular telecommunication network. It is then necessary that the home base stations do not consume too much electric power while keeping a good quality of service for mobile terminals.

The home base stations may enable a limited number of mobile terminals to access the wireless cellular telecommunication network through their respective resources. The mobile terminals allowed to access the resources of the network through a home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and his family can access the wireless cellular telecommunication network through the home base station. These mobile terminals are associated with the home base station.

Furthermore, home base stations may not be powered on anytime. The owner of a home base station may decide or the home base station may be configured for saving electric power energy, to switch in a power off state.

When a home base station moves from a power off state to a power on state, it may suddenly modify the wireless link condition between mobile terminals wandering close to the home base station and the base station or home base station serving the mobile terminals.

The same power on/power off change may also appear for base stations.

The present invention aims at reducing the overall electric power consumption of a wireless cellular telecommunication network while guaranteeing a minimal quality of service to mobile terminals.

The present invention concerns a method for setting, in a wireless cellular telecommunication network, the power of the radio signals transferred by a home base station and/or of the radio signals transferred by mobile terminals served by the node, characterised in that the method comprises the steps of:

receiving, from at least one neighbouring node, at least one parameter value used by the neighbouring node for setting the power of the radio signals transferred by the neighbouring node and/or of the radio signals transferred by mobile terminals served by the neighbouring node, determining, at least from the parameter value, a parameter value to be used by the node for setting the power of the radio signals transferred by the node and/or of the radio signal transferred by mobile terminals served by the node, setting the power of the radio signals transferred by the node and/or of the radio signals transferred by mobile terminals served by the node according to the determined parameter value, transferring the determined parameter value to the at least two neighbouring nodes.

The present invention concerns also a device for setting, in a wireless cellular telecommunication network, the power of the radio signals transferred by a node and/or of the radio signals transferred by mobile terminals served by the node, characterised in that the device for setting the transmission power is included in the node and comprises:

means for receiving, from at least one neighbouring node, at least one parameter value used by the neighbouring node for setting the power of the radio signals transferred by the neighbouring node and/or of the radio signals transferred by mobile terminals served by the neighbouring node, means for determining, at least from the parameter value, a parameter value to be used by the node for setting the power of the radio signals transferred by the node and/or of the radio signal transferred by mobile terminals served by the node, means for setting the power of the radio signals transferred by the node and/or of the radio signals transferred by mobile terminals served by the node according to the determined parameter value, means for transferring the determined parameter value to the at least one neighbouring node.

Thus, the radiated power of the radio signals transferred by the node and/or of the radio signals transferred by mobile terminals served by the node minimization takes into account the radiated power of the at least one neighbouring node of the node.

According to a particular feature, the determined parameter value is inversely proportional of the sum of the inverse of the received parameter values.

Thus, the overall convergence of the minimization process is increased since each determined parameter is mainly driven by the lowest parameter value among the received at least one parameter of the neighbouring nodes.

According to a particular feature, parameters are obtained on the link condition between the node, the neighbouring nodes and mobile terminals served by the node and the determined parameter value is dependent on the parameters.

Thus, the determined parameter determination gives more importance to the significant interfering nodes and/or terminals served by the neighbouring nodes.

According to a particular feature, the link conditions are the path gains between the mobile terminal among the mobile terminals served by the node which has the worst signal to noise plus interference ratio with the node and the link conditions further include the path gains between the neighbouring nodes and said mobile terminal served by the node.

Thus, the radiated power minimization procedure is performed to achieve a minimum tolerable signal to interference plus noise ratio for the mobile terminals served by the node and by doing so reducing drop calls and achieving good quality of service for said cell edge mobile terminals.

According to a particular feature, the power of the radio signals transferred by the node and/or of the radio signals transferred by mobile terminals served by the node is set according to the path gain between the mobile terminal among the mobile terminals served by the node which has the worst signal to noise plus interference ratio with the node and path gains between the neighbouring nodes and said mobile terminal served by the node and/or path gains between the mobile terminals served by the neighbouring nodes with the node.

Thus, the determined parameter is set in order to achieve a minimum tolerable signal to noise and interference ratio and a good quality of service for mobile terminals served by the node both in downlink and/or uplink.

The overall power minimization procedure is ensuring good quality of service to mobile terminal served by the home base station experiencing the worst performance in the cell.

According to a particular feature, prior the node moves into a state wherein no mobile terminal may be served by the node, the node transfers to the at least two neighbouring nodes a predetermined value of the parameter value.

Thus, the radiated power minimization procedure dynamically adapts the determined parameter determination to take into account node turning off.

According to a particular feature, the node detects a change in the state of at least one mobile terminal served by the node and transfers to the at least two neighbouring nodes the predetermined parameter value if a change in the state of at least one mobile terminal served by the node is detected.

Thus, the radiated power minimization procedure dynamically adapts the determined parameter determination to take into account mobile terminals mobility and/or idle state.

According to a particular feature, once the node moves into a state wherein at least one mobile terminal may be served by the node, the node transfers to the at least two neighbouring nodes the predetermined parameter value.

Thus, the radiated power minimization procedure dynamically adapts the determined parameter determination to take into account node turning on.

According to a particular feature, if one parameter value used by a neighbouring node is not received during a given period of time, the node sets said one parameter value to null value.

Thus, only the active nodes and non-outdated parameters are taken into account in the determined parameter determination.

According to a particular feature, the parameter values are received and transferred through a backbone network linking the node and the at least two neighbouring nodes or the parameter values are received and transferred under the form of radio signals.

Thus, when the parameter values are received and transferred through a backbone network, the present invention allows the overall power minimization procedure to ensure good quality of service to mobile terminal served by the node even if the node cannot communicate with the at least two neighbouring nodes through wireless signals.

If the parameter values are received and transferred under the form of radio signals, there is no need to establish backbone connection between at least two neighbouring nodes and the node and the latency of the procedure is minimized.

According to still another aspect, the present invention concerns computer programs which can be directly loadable into a programmable device, comprising instructions or portions of code for implementing the steps of the method according to the invention, when said computer programs are executed on a programmable device.

The present invention also concerns an information storage means, storing a computer program comprising a set of instructions that can be run by a processor for implementing the aforementioned method in any one of its various embodiments, when the stored information is read by a computer and run by a processor.

Since the features and advantages relating to the computer programs are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 5:
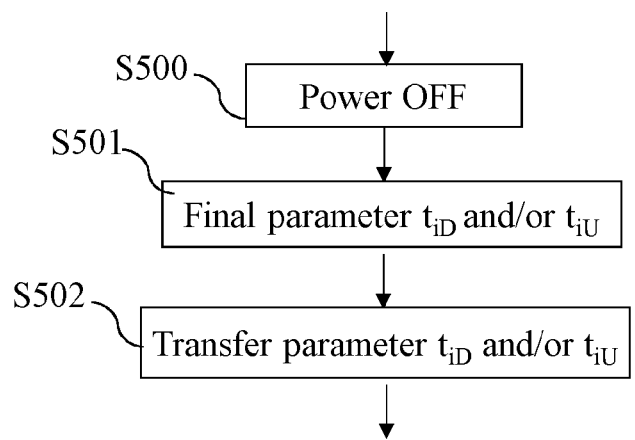
Figure 3:
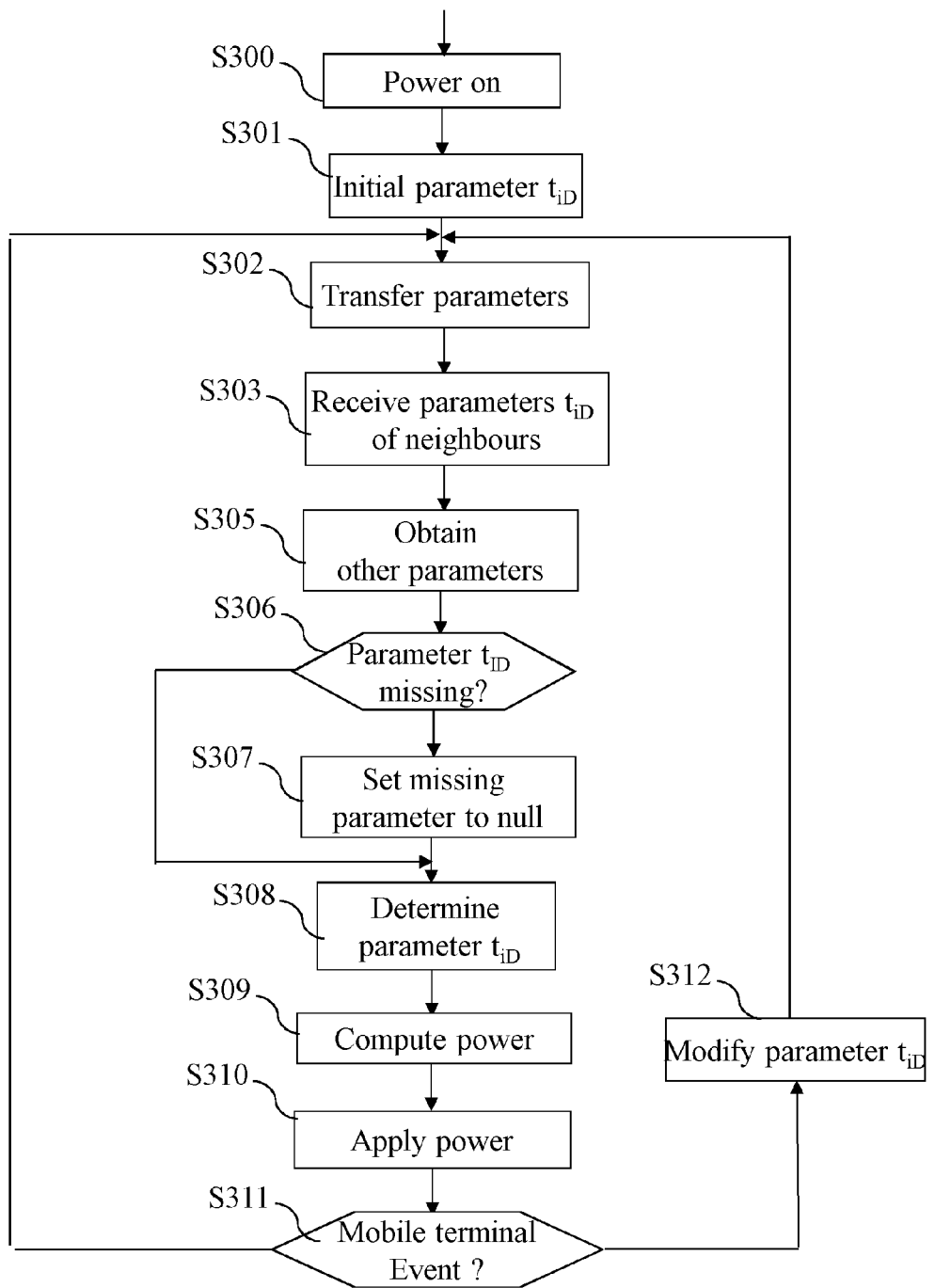
Figure 4:
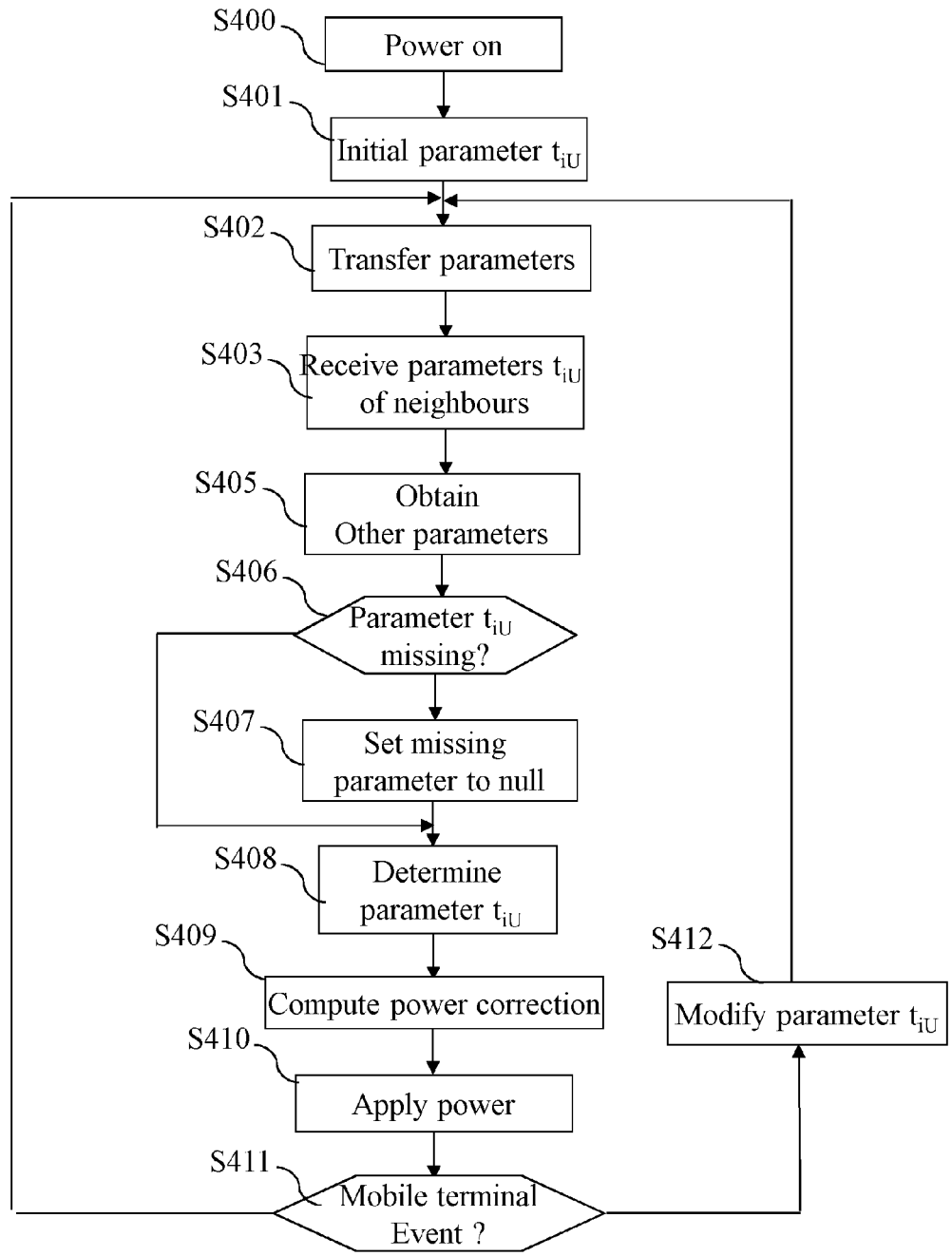

FIG. 3 discloses an algorithm executed by each node for downlink signal transmit power adjustment according to the present invention;

FIG. 4 discloses an algorithm executed by each node for uplink signal transmit power adjustment according to the present invention;

FIG. 5 discloses an algorithm executed by each node when the node will move into a state wherein the node cannot serve mobile terminals.

Figure 1:
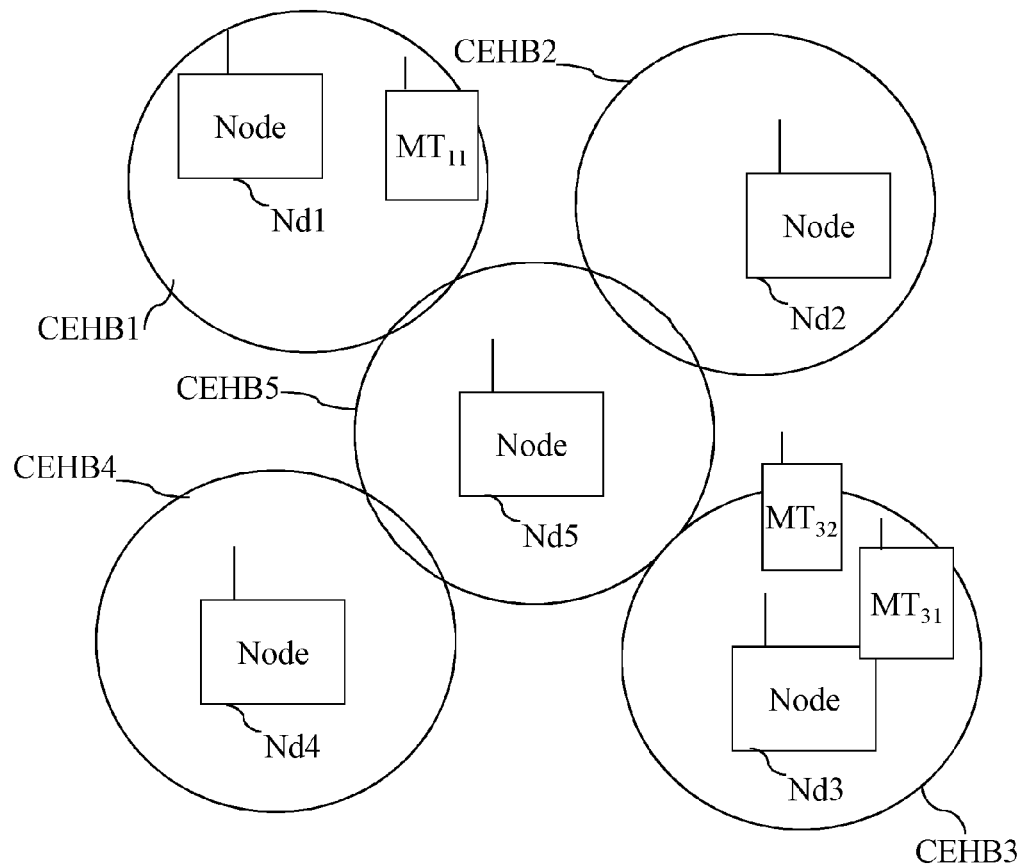
FIG. 1 represents a wireless cellular telecommunication network in which the present invention is implemented.

FIG. 1 represents a wireless cellular telecommunication network in which the present invention is implemented.

In FIG. 1, five nodes Nd1, Nd2, Nd3, Nd4 and Nd5 of a wireless cellular telecommunication network are shown.

Only five nodes Nd1 to Nd5 are shown but we can understand that the present invention works when a more or less important number of base stations BS and/or nodes Nd exist.

The nodes Nd are linked by a backbone network which may be, for example, a DSL (Digital Subscriber Line) network or an ISDN (Integrated Services Digital Network).

The nodes Nd1 to Nd5 are nodes of the wireless cellular telecommunication network which serve mobile terminals MT located in their respective cells CEBH1 to CEBH5.

The node Nd1 serves the mobile terminal $MT_{11}$ and the node Nd3 serves the mobile terminals $MT_{31}$ and $MT_{32}$.

Only three mobile terminals $MT_{11}$, $MT_{31}$ and $MT_{32}$ are shown in FIG. 1 for the sake of clarity but we can understand that the present invention works when a more or less important number of mobile terminals exist.

As already stated, the nodes Nd1 to Nd5 are named also base stations, femto base stations or pico base stations or relays.

For example, a relay is a node Nd which is connected to the wireless cellular telecommunication network via a wireless link with a base station, not shown in FIG. 1, of the wireless cellular telecommunication network.

Each node Nd1 to Nd5, when the node is a home base station, may be located into home and may enable mobile terminals MT associated to the concerned node Nd to access the wireless cellular telecommunication network.

For example, a node Nd, when the node is a home base station, and a mobile terminal MT are associated when the node Nd belongs to the owner of the mobile terminal MT or when the node Nd belongs to the family or friends of the owner of the mobile terminal MT.

When a mobile terminal MT is served by a node Nd, it can receive or establish or continue a communication with a remote telecommunication device through the node Nd.

The node Nd1 is able to receive signals transferred by the mobile terminal $MT_{11}$ which is located in the area or cell CEHB1. The node Nd1 transfers signals which can be received and processed by the mobile terminal $MT_{11}$ located in the cell CEHB1. The node Nd3 is able to receive signals transferred by mobile terminals $MT_{31}$ and $MT_{32}$ which are located in the area or cell CEHB3. The node Nd3 transfers signals which can be received and processed by mobile terminals $MT_{31}$ and $MT_{32}$ located in the cell CEHB3.

In the example of FIG. 1, each node Nd1 to Nd5 has only one cell CEHB1 to CEHB5. The present invention is also applicable when at least one node Nd has plural cells.

According to the invention, each node Nd sets the power of the radio signals transferred by the node and/or of the radio signals transferred by mobile terminals served by the node by:

receiving, from at least one neighbouring node, at least one parameter value used by the neighbouring node for setting the power of the radio signals transferred by the neighbouring node and/or of the radio signals transferred by mobile terminals served by the neighbouring node, determining, at least from the parameter value, a parameter value to be used by the node for setting the power of the radio signals transferred by the node and/or of the radio signal transferred by mobile terminals served by the node, setting the power of the radio signals transferred by the node and/or of the radio signals transferred by mobile terminals served by the node according to the determined parameter value, transferring the determined parameter value to the at least one neighbouring node.

Figure 2:
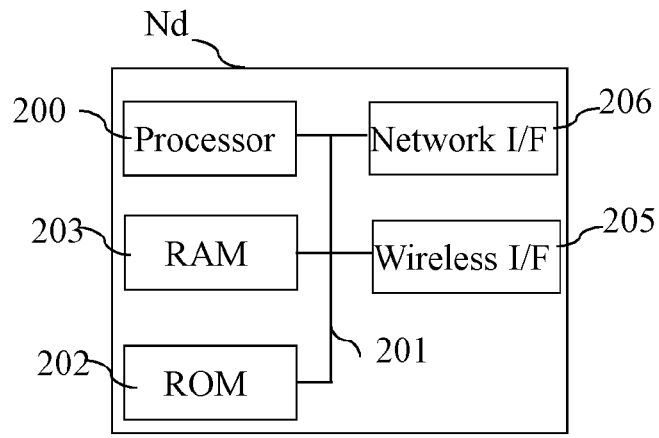
FIG. 2 is a diagram representing the architecture of a node in which the present invention is implemented.

FIG. 2 is a diagram representing the architecture of a node in which the present invention is implemented.

The node Nd has, for example, an architecture based on components connected together by a bus 201 and a processor 200 controlled by the program as disclosed in FIGS. 3, 4 and 5.

The bus 201 links the processor 200 to a read only memory ROM 202, a random access memory RAM 203, a wireless interface 205. The bus 201 may link the processor 200 to a network interface 206.

The memory 203 contains registers intended to receive variables and the instructions of the program related to the algorithms as disclosed in FIGS. 3, 4 and 5 together with a table linking neighbouring node identifiers and parameter values received from said neighbouring nodes.

The processor 200 controls the operation of the network interface 206 and may control the operation of the wireless interface 205.

The read only memory 202 contains instructions of the programs related to the algorithms as disclosed in FIGS. 3, 4 and 5, which are transferred, when the node Nd is powered on, to the random access memory 203.

The node Nd may be connected to a backbone network through the network interface 206. For example, the network interface 206 is a DSL modem, or an ISDN interface, etc. Through the network interface 206, the node Nd may transfer messages to the core network of the wireless cellular telecommunication network or transfers or receives parameter values to neighbouring nodes Nd.

The wireless interface 205 comprises means for transferring signals according to the transmission power set according to the present invention.

The wireless interface 205 may comprise means for transferring parameter values according to the present invention.

The function of the network interface 206 may be executed by the wireless interface 205, for example when the node Nd acts as a relay.

The wireless interface 205 and the network interface 206 are the resources of the node Nd used by a mobile terminal MT in order to access to the wireless cellular telecommunication network when the mobile terminal MT establishes or receives a communication with a remote telecommunication device.

Any and all steps of the algorithm described hereinafter with regard to FIG. 3 or 4 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 discloses an algorithm executed by each node for downlink signal transmit power adjustment according to the present invention.

More precisely, the present algorithm is executed by the processor 200 of each node Nd.

At step S300, the processor 200 detects the switching of the node Ndi, where i denotes the index of the node Ndi, to a power on state wherein the node Ndi may serve a mobile terminal MT located in the cell CEHB of the node Ndi.

At next step S301, the processor 200 reads into the ROM memory an initial parameter $t_{iD}$ value to be used by neighbouring nodes Nd for determining power of the radio signals they transfer in their respective cell CEHB.

For example the initial parameter $t_{iD}$ value of the node Ndi is set to a low value, for example at less than twenty of the maximal value the parameter $t_{iD}$ can take.

At next step S302, the processor 200 commands the transfer of the parameter $t_{iD}$ value through the network interface 206 to the neighbouring nodes Ndj of the node Ndi.

At the same step, the processor 200 commands the transfer of other parameters $\hat{\lambda}_{iD}$ and $\alpha_{i,u,j}$ which will be disclosed hereinafter.

For example, the processor 200 reads into the RAM memory 203, information identifying each neighbouring node Nd and commands the transfer of the parameter $t_{iD}$ value and other parameters to each identified neighbouring nodes Nd through the backbone network and the network interface 206.

A neighbouring node Nd is a node Nd of which the cell CEHB is a neighbour and/or overlaps the cell CEHBi of the node Ndi.

According to a first variant, the parameter $t_{iD}$ calculation is based on the measurements received from mobile terminal MT corresponding to the worst SINR in the cell CEHBi.

According to a second variant of realization of the present invention, information identifying each neighbouring nodes Nd are derived from measurement reports transferred by mobile terminals MT served by the node Nd or by monitoring handovers which have been conducted for mobile terminals MT served by the node Nd.

According to a third variant of realization of the present invention, the parameter $t_{iD}$ value and other parameters are broadcasted in the cell CEHBi and received by neighbouring nodes Nd.

The parameter $t_{iD}$ value and other parameters may be directly received by neighbouring nodes Nd or may be decoded and forwarded by the mobile terminals MT served by the node Nd.

According to a fourth variant of realization of the present invention, the parameter $t_{iD}$ and the other parameters are transferred through a broadcast radio channel between the nodes Nd.

According to a particular mode of realization of the fourth variant, the parameter $t_{iD}$ and the other parameters are transferred with a random gossip approach.

In that case, all nodes Nd use the same resource to transmit or receive the parameter $t_{iD}$.

Each node Nd chooses randomly its receiving or transmitting state.

At next step S303, the processor 200 detects the reception of parameters $t_{jD}$ values currently used by each neighbouring node Ndj for the power adjustment of downlink signals they transfer in their respective cell. Each parameter $t_{jD}$ value is received through the network interface 206 or through the wireless interface 205.

At next step S305, the processor 200 obtains at least other parameters related to the wireless link between the node Ndi and each mobile terminal MT served by the node Ndi.

For example, other parameters comprise the downlink path gains $\alpha_{i,l,j}$ between the node Ndj and each mobile terminal $Mt_{i,l}$ served by the node Ndi, where l denotes the index of the l-th mobile terminal served by the node Ndi.

A downlink channel is the wireless link on which signals are transferred from the node Nd to a mobile terminal MT served by the node Nd.

The other parameters may further comprise information identifying each neighbouring node Ndj, transferred for example in the system information bloc (SIB) of the Ndj.

The other parameters comprise the parameters $\hat{\lambda}_{jD}$ and $\alpha_{j,u,i}$ which will be disclosed hereinafter.

The node Ndi stores the last received parameters into a table and uses these stored values for the $t_{iD}$ parameter update in order to build statistics and/or to detect a sudden modification of neighboring conditions or only uses the instantaneous received parameters $t_{iD}$ values.

The table links received parameters values received from one neighbouring node together with information identifying the neighbouring node Nd which sent the received parameters.

The table may further comprise a timestamp which indicates, for each received parameter value $t_{iD}$, the time of reception of the parameter value $t_{iD}$.

At next step S306, the processor 200 checks if at least one parameter value $t_{jD}$ has not been received at step S303.

The processor 200 checks if at least one parameter value $t_{jD}$ has not been received by checking, for example, if a timestamp stored in the table is not too old. For example, if the difference between current time and timestamp value is not upper than a predetermined value, for example one minute.

If at least one parameter value $t_{jD}$ has not been received at step S303, the processor 200 moves to step S307.

Otherwise, the processor 200 moves to step S308.

At step S307, the processor 200 sets the parameter value $t_{jD}$ associated to each too old timestamp to a predetermined value. For example the parameter value $t_{jD}$ is set to a low value, for example at less than twenty of the maximal value the parameter value $t_{jD}$ can take or to null value.

After that, the processor 200 moves to step S308.

It has to be noted here that in a variant, the processor 200 does not execute the step S306 and moves from step S305 to step S308.

At next step S308, the processor 200 determines the parameter $t'_{Di}$ value to be used by the node Ndi for setting the power of the radio signals transferred by the node Ndi in the cell CEHBi.

For example, the parameter $t'_{Dj}$ value is determined at least from the parameter values $t_{Dj}$ transferred by neighbouring nodes Nd according to the following formula:

$$t'_{iD} = f(t_{\Omega_i(1)D}, \ldots, t_{\Omega_i(n_i)D}, t_{iD})$$

where $\Omega_i$ is the set of indexes of the neighbouring nodes Nd of the i-th node Ndi, with cardinality $n_i$, and f( ) is a consensus function allowing the processing of the update.

According to a first example, f( ) may be chosen as:

$$\frac{1}{t'_{iD}} = \frac{1}{n_i + 1}\left(\sum_{j \in \Omega_i} \frac{1}{t_{jD}} + \frac{1}{t_{iD}}\right)$$

According to a second example, f( ) is further dependent of the downlink path gains between the nodes Ndj and Ndi and the u-th mobile terminal served by the node Ndi which has the minimum SINR among the mobile terminals MT served by the node Ndi. f( ) may be chosen as:

$$\frac{1}{t'_{iD}} = \frac{1}{\sum_{j \in \Omega_i} P_{jD}\alpha_{i,u,j} + P_{iD}\alpha_{i,u,i}}\left(\sum_{j \in \Omega_i} \frac{P_{jD}\alpha_{i,u,j}}{t_{jD}} + \frac{P_{iD}\alpha_{i,u,i}}{t_{iD}}\right)$$

where $\alpha_{i,u,j}$ denotes the downlink path gain between the node Ndj and the u-th mobile terminal $MT_{i,u}$ served by the node Ndi and which has the minimum SINR among the mobile terminals MT served by the node Ndi. $\alpha_{i,u,i}$ denotes the downlink path gain between the node Ndi and the u-th mobile terminal served by the node Ndi and experiencing the worst SINR among the mobile terminals MT served by the node Ndi, and $P_{iD}$ is the power of radio signals transferred by the node Ndi in the cell CEHBi and $P_{jD}$ is the power of radio signals transferred by the node Ndj in the cell CEHBj.

According to a third example, f( ) may be chosen as:

$$\frac{1}{t'_{iD}} = \mu_{iD} \frac{1}{\sum_{j \in \Omega_i} P_{jD}\alpha_{i,u,j} + P_{iD}\alpha_{i,u,i}}\left(\sum_{j \in \Omega_i} \frac{P_{jD}\alpha_{i,u,j}}{t_{jD}} + \frac{P_{iD}\alpha_{i,u,i}}{t_{iD}}\right)$$

where $0<\mu_{iD}<1$ and $\mu_{iD}$ may be a time decreasing function for downlink signal transmission.

According to a fourth example, f( ) may be chosen as:

$$\frac{1}{t'_{iD}} = \mu_{iD} \frac{1}{(\Omega_i + 1)\left(\max\left(\begin{array}{c}P_{\Omega_i(1)D}\alpha_{i,u,\Omega_i(1)}, \cdots, \\ P_{\Omega_i(n_i)D}\alpha_{i,u,\Omega_i(n_i)}, P_{iD}\alpha_{i,u,i}\end{array}\right)\right)} \left(\sum_{j\in\Omega_i}\frac{P_{jD}\alpha_{i,u,j}}{t_{jD}} + \frac{P_{iD}\alpha_{i,u,i}}{t_{iD}}\right)$$

Finally, the processor 200 sets the parameter $t_{iD}$ value to the value of the parameter $t'_{iD}$ value.

At next step S309, the processor 200 computes the new power $P_{iD}$ of radio signals transferred by the node Ndi in the cell CEHBi.

The power $P_{iD}$ of the node Ndi is for example determined by computing the optimization of the utility function $G_{iD}$ based on its neighbouring nodes, i.e.

$$G_{iD} = \sum_{k\in\Omega_i} P_{kD} + P_{iD}$$

The minimization is done under a constraint of coverage in downlink, expressed by a minimal tolerated value $\gamma_{iD}$ of the worst downlink SINR experienced by the mobile terminal $MT_{i,u}$, served by the node Ndi, i.e., $$\frac{\alpha_{i,u,i}P_{iD}}{\sum_{j\in\Omega_i} P_{jD}\alpha_{i,u,j} + N_0} \geq \gamma_{iD}$$

In order to process the optimization for downlink, the present invention uses the log barrier method as follows. The node Ndi obtains the parameters $\hat{\lambda}_{jD}$, $\alpha_{j,u,i}$ from each neighbouring node Ndj. The node Ndi computes the parameter $\lambda_{iD}$ as a function of the obtained parameters $\hat{\lambda}_{jD}$, and $\alpha_{j,u,i}$ and the parameter $t_{iD}$ previously determined.

$$\lambda_{iD} = t_{iD} + \sum_{j\in\Omega_i}\frac{\gamma_{jD}\alpha_{j,u,i}}{\alpha_{j,u,j}}\lambda_{jD} = t_{iD} + \sum_{j\in\Omega_i}\alpha_{j,u,i}\hat{\lambda}_{jD}$$

and $$\hat{\lambda}_{jD} = \frac{\gamma_{jD}}{\alpha_{j,u,j}}\lambda_{jD}$$

Then, the node Ndi computes its updated transmit power as follows $$P_{iD} = \frac{1}{\lambda_{iD}} + \frac{\gamma_{iD}}{\alpha_{i,u,i}}\left(\sum_{j\in\Omega_i} P_{jD}\alpha_{i,u,j} + N_0\right)$$

where $\gamma_{iD}$ is the minimal signal interference plus noise ratio (SINR) threshold that can be tolerated in the cell of the node Ndi for downlink signals, $N_0$ is the noise level measured by the node Ndi. It has to be noted that the received power $P_{jD}\alpha_{i,u,j}$ and path gain $\alpha_{i,u,j}$ can be directly measured at the mobile terminal $MT_{i,u}$. In that case, the parameters $\alpha_{i,u,j}$ and $\hat{\lambda}_{jD}$ are the other parameters transferred at step S302 to its neighbours.

In another embodiment of the invention, the constraint of coverage in downlink is performed according to $g_{iD}$ ($y_i$, $y_{\Omega_i(1)}$, . . . , $y_{\Omega_i(n_i)}$) which is a multivariate probability function that a mobile terminal MT served by the node Ndi experiences a SINR lower than the threshold $\gamma_{iD}$, i.e. one optimizes the node Ndi transmit power under the constraint $$g_{iD}(y_i, y_{\Omega_i(1)}, \cdots, y_{\Omega_i(n_i)}) = P\left(\frac{\alpha_{i,1,i}y_i}{\sum_{j\in\Omega_i} y_j\alpha_{i,1,j} + N_0} \geq \gamma_{iD}\right) \geq Q_{iD}$$

Where the probability is defined according to instantaneous measurements $\alpha_{i,l,j}$ of the mobile terminals $MT_{i,l}$ or on stored previous values, and where $Q_{iD}$ is a target quality of service, which is for example equal to 99%.

The node Ndi computes, for each neighbouring node Ndj:

$$\varphi_{jiD}(y_i) = \frac{\partial \theta_{jiD}(y_i)}{\partial y_i} \times \frac{1}{\theta_{jiD}(y_i) - Q_{jD}}$$

where $\theta_{jiD}(y_i)$ is equal to the function $g_{jD}$ ($y_j$, $y_{\Omega j(1)}$, . . . , $y_{\Omega j(n_j)}$) when all entries are fixed to the obtained values $P_{\Omega_j(k)D}$ except for the considered Ndi.

The node Ndi then updates its transmit power according to the solution of $$\sum_{j\in\Omega_i} \varphi_{jiD}(P_{iD}) + \varphi_{iiD}(P_{iD}) = t_{iD}$$

As a remark, the function $\phi_{jiD}(y_{iD})$ can be computed at the node Ndi from the parameters $\alpha_{j,l,i}$ received during step S305 from node Ndj, and obtained by numerical computation, as well as the updated $P_{iD}$ value.

It has to be noted here that in a variant, the functions $\phi_{jiD}(y_{iD})$ can also be computed by each neighboring node Ndj and transferred to the node Ndi during step S303.

At next step S310, the processor 200 commands the wireless interface 205 in order to apply the determined power $P_{iD}$.

At next step S311, the processor 200 checks if there is an event for at least one mobile terminal MT served or previously served by the node Ndi. An event is for example, the power off of a mobile terminal MT or a handover of a mobile terminal MT or a power on of a mobile terminal MT or an establishment of a communication between a mobile terminal MT with a remote telecommunication device or a release of a communication between a mobile terminal MT with a remote telecommunication device.

If there is an event for at least one mobile terminal MT, the processor 200 moves to step S312. Otherwise, the processor 200 returns to step S302 already described in order to transfer the parameter $t_{iD}$ determined at step S308.

At step S312, the processor 200 modifies the parameter $t_{iD}$.

For example, the processor 200 sets the parameter value $t_{iD}$ associated to each too old timestamp to a predetermined value. For example the parameter value $t_{iD}$ is set to a low value, for example at less than twenty of the maximal value the parameter value $t_{iD}$ can take or to null value.

After that, the processor 200 returns to step S302 already described in order to transfer the parameter $t_{iD}$.

FIG. 4 discloses an algorithm executed by each node for uplink signal transmit power adjustment according to the present invention.

Before the algorithm starts, each node Ndi sets each mobile terminal $MT_{i,l}$ to a reference transmit power. The node Ndi then receives a power $\beta_{j,l,i}$ from the l-th mobile terminal of the node Ndj.

At step S400, the processor 200 detects the switching of the node Ndi, where i denotes the index of the node Ndi, to a power on state wherein the node Ndi may serve a mobile terminal MT located in the cell CEHB of the node Ndi.

At next step S401, the processor 200 reads into the ROM memory an initial parameter $t_{iU}$ value to be used by neighbouring nodes Nd for determining the power correction applied on the radio signals transferred by the mobile terminals MT served by the node Ndi.

For example, the initial parameter $t_{iU}$ value of the node Ndi is set to a low value, for example at less than twenty of the maximal value the parameter $t_{iU}$ can take.

At next step S402, the processor 200 commands the transfer of the parameter $t_{iU}$ value through the network interface 206 to the neighbouring nodes Ndj of the node Ndi.

At the same step, the processor 200 commands the transfer of other parameters $b_i \beta_{i,u,j}$ and $\hat{\lambda}_{iU}$ which will be disclosed hereinafter.

For example, the processor 200 reads into the RAM memory 203, information identifying each neighbouring nodes Nd and commands the transfer of the parameter $t_{iU}$ value and other parameters to each identified neighbouring nodes Nd through the backbone network and the network interface 206.

According to a first variant, the parameter $t_{iU}$ calculation is based on the parameters received from mobile terminal MT corresponding to the worst uplink SINR in the cell CEHBi.

According to a second variant of realization of the present invention, information identifying each neighbouring nodes Nd are derived from measurement reports transferred by mobile terminals MT served by the node Nd or by monitoring handovers which have been conducted for mobile terminals MT served by the node Nd.

According to a third variant of realization of the present invention, the parameter $t_{iU}$ value and other parameters are broadcasted in the cell CEHBi and received by neighbouring nodes Nd.

The parameter $t_{iU}$ value and other parameters may be directly received by neighbouring nodes Nd or may be decoded and forwarded by the mobile terminals MT served by the node Nd.

According to a fourth variant of realization of the present invention, the parameter $t_{iU}$ and the other parameters are transferred through a broadcast radio channel between the nodes Nd.

According to a particular mode of realization of the fourth variant, the parameter $t_{iU}$ and other parameters are transferred with a random gossip approach.

In that case, all nodes Nd use the same resource to transmit or receive the parameter $t_{iU}$.

Each node Nd chooses randomly its receiving or transmitting state.

At next step S403, the processor 200 detects the reception of parameters $t_{jU}$ values currently used by each neighbouring node Ndj for the power adjustment of uplink signals they transfer in their respective cell. Each parameter $t_{jU}$ value is received through the network interface 206 or through the wireless interface 205.

At the same step, the processor 200 detects the reception of other parameters $\hat{\lambda}_{jU}$ and $b_i \beta_{i,u,j}$ which will be disclosed hereinafter.

At next step S405, the processor 200 obtains at least parameters related to the uplink wireless link between the node Ndi and each mobile terminal MT served by the node Ndi.

Also, parameters may include the uplink received powers $b_j \beta_{j,l,i}$ at the node Ndi from each mobile terminal $MT_{j,l}$ served by the node Ndj, where l denotes the index of the l-th mobile terminal served by the node Ndj when a power correction $b_j$ is applied at node Ndj.

Otherwise, the uplink received powers $b_i \beta_{j,l,i}$ are computed at the node Ndj and forwarded to the node Ndj as parameters, as described hereafter.

An uplink channel is the wireless link on which signals are transferred from a mobile terminal MT to the node Nd serving the mobile terminal MT.

The parameters comprise power corrections parameters $b_j$ used by the neighbouring nodes Ndj of the node Ndi for adjusting the radio signals transferred by the mobile terminals served by the neighbouring nodes Ndj of the node Ndi.

The parameters may further comprise information identifying each neighbouring node Ndj, transferred for example in the system information bloc (SIB) of the Ndj.

The node stores the last received parameters into a table and uses these stored values for the $t_{iU}$ parameter update in order to build statistics and/or to detect a sudden modification of neighboring conditions or only uses the instantaneous received parameters $t_{iU}$ values.

The table links received parameter values received from one neighbouring node, together with information identifying the node Nd which sent the received parameters.

The table may further comprise a timestamp which indicates, for each received parameter value $t_{iU}$, the time of reception of the parameter value $t_{iU}$.

At next step S406, the processor 200 checks if at least one parameter value $t_{iU}$ has not been received at step S403.

The processor 200 checks if at least one parameter value $t_{jU}$ has not been received by checking, for example, if a timestamp stored in the table is not too old. For example, if the difference between current time and timestamp value is not upper than a predetermined value, for example one minute.

If at least one parameter value $t_{jU}$ has not been received at step S405, the processor 200 moves to step S407.

Otherwise, the processor 200 moves to step S408.

At step S407, the processor 200 sets the parameter value $t_{jU}$ associated to each too old timestamp to a predetermined value. For example, the parameter value is set to a low value, for example at less than twenty of the maximal value the parameter value $t_{jU}$ can take or to null value.

After that, the processor 200 moves to step S408.

It has to be noted here that in a variant, the processor 200 does not execute the step S406 and moves from step S405 to step S408.

At next step S408, the processor 200 determines the parameter $f_{iu}$ value to be used by the node Ndi for setting the power correction of the radio signals transferred by the mobile terminals MT served by the node Ndi transfer.

For example, the parameter $t'_{iU}$ value is determined at least from the parameter values transferred by neighbouring nodes Nd according to the following formula:

$$t'_{iU} = f(t_{\Omega_i(1)U}, \ldots, t_{\Omega_i(n_i)U}, t_{iU})$$

where $\Omega_i$ is the set of indexes of the neighbouring nodes Nd of the i-th node Ndi, with cardinality $n_i$, and f( ) is a consensus function allowing the processing of the update.

For example, f( ) may be chosen as:

$$\frac{1}{t'_{iU}} = \mu_{iU} \frac{1}{(\Omega_i + 1)(\max(b_{\Omega_i(1)}\beta_{\Omega_i(1),u,i}, \ldots, b_{\Omega_i(n_i)}\beta_{\Omega_i(n_i),u,i}, b_i\beta_{i,u,i}))} \left( \sum_{j \in \Omega_i} \frac{b_j \beta_{j,u,i}}{t_{jU}} + \frac{b_i \beta_{i,v,i}}{t_{iU}} \right)$$

where $0 < \mu_{iU} < 1$ and $\mu_{iU}$ may be a time decreasing function for uplink signal transmission, $b_l \beta_{i,l,j}$ is the power received in uplink by the j-th node Ndj from the l-th $MT_l$ of the i-th node Ndi; $b_j \beta_{j,u,i}$ is the power received in uplink by the i-th node Ndi from the u-th mobile terminal $MT_{j,u}$ of the j-th node Ndj, which generates the most interference on the uplink of the node Ndi, and $b_i \beta_{i,v,i}$ is the power received in uplink by the i-th node Ndi from the v-th mobile terminal $MT_{i,v}$ of the i-th node Ndi, which is received with the lowest power on the uplink of the node Ndi.

The parameter $b_j$ is a power correction applied to a subset of mobile terminals MT of the node Ndj. The subset of mobile terminals MT is selected from the highest interfering mobile terminals MT, i.e. the ones with highest received power $\beta_{j,l,i}$ to the neighboring nodes.

The received power $b_l \beta_{j,l,i}$ can be either measured at the node Ndi or computed at the node Ndj from the downlink measured path gain $\alpha_{j,l,i}$ times the terminal $MT_{j,l}$ reference transmit power, times the power correction $b_j$. In the following, we assume that $b_j \beta_{j,u,i}$ is computed at Ndj, as well as $\beta_{j,u,i}$.

Finally, the processor 200 sets the parameter $t_{iU}$ value to the value of the parameter $t'_{iU}$ value.

At next step S409, the processor 200 computes the uplink correction parameter $b_i$.

The power correction $b_i$ is for example determined by computing the optimization of the utility function $G_{iU}$ based on its neighbouring nodes, i.e.

$$G_{iU} = \sum_{k \in \Omega_i} b_k + b_i$$

The minimization is done under a constraint of coverage in uplink, expressed by a minimal tolerated value $\gamma_{iU}$ of the worst uplink SINR experienced by the mobile terminal $MT_{i,v}$, served by the node Ndi, i.e., $$\frac{\beta_{i,v,i} b_i}{\sum_{j \in \Omega_i} b_j \beta_{j,u,i} + N_0} \geq \gamma_{iU}$$

For the uplink channels, in order to process the optimization, the present invention uses the log barrier method as follows. The node Ndi computes the parameter $\lambda_{iU}$ as a function of the obtained parameters $\hat{\lambda}_{jU}$, and the parameter $t_{iU}$ previously determined.

$$\lambda_{iU} = t_{iU} + \sum_{j \in \Omega_i} \frac{\gamma_{jU} \beta_{i,u,j}}{\beta_{j,v,j}} \lambda_{jU} = t_{iU} + \sum_{j \in \Omega_i} \beta_{i,u,j} \hat{\lambda}_{jU}$$

and $$\hat{\lambda}_{jU} = \frac{\gamma_{jU}}{\beta_{j,v,j}} \lambda_{jDU}$$

Then, the node Ndi computes its updated power correction as a function of the obtained parameter $b_j \beta_{j,u,i}$:

$$b_i = \frac{1}{\lambda_{iU}} + \frac{\gamma_{iU}}{\beta_{i,v,i}} \left( \sum_{j \in \Omega_i} b_j \beta_{j,u,i} + N_0 \right)$$

where $\gamma_{iU}$ is the minimal signal interference plus noise ratio (SINR) threshold that can be tolerated in the cell of the node Ndi for the uplink, $N_0$ is the noise level measured by the node Ndi. The updated parameters $\hat{\lambda}_{iU}$ and $b_i \beta_{i,u,j}$ are transferred to its neighbouring nodes Ndj at step S402.

In another embodiment of the invention, the constraint of coverage in uplink is performed according to $h_{iU}(x_i, x_{\Omega_i(1)}, \ldots, x_{\Omega_i(n_i)})$, which is the multivariate probability function that a mobile terminal MT in communication with node Ndi experiences a SINR lower than the threshold $\gamma_{iU}$, i.e. one optimizes the nodes transmit power under the constraint:

$$h_{iU}(x_i, x_{\Omega_i(1)}, \ldots, x_{\Omega_i(n_i)}) = P \left( \frac{\beta_{i,1,i} x_i}{\sum_{j \in \Omega_i} x_j \beta_{j,1,i} + N_0} \geq \gamma_{iU} \right) \geq Q_{iU}$$

where the probability is defined according to instantaneous measurements $\beta_{j,l,i}$ of the mobile terminals $MT_{i,l}$ or on stored previous values, and where $Q_{iU}$ is the target quality of service.

The node Ndi computes, for each neighbouring node Ndj $$\varphi_{jiU}(x_i) = \frac{\partial \theta_{jiU}(x_i)}{\partial x_i} \times \frac{1}{\theta_{jiU}(x_i) - Q_{iU}}$$

where $\theta_{jiU}(x_i)$ is equal to the function $h_{jU}(x_i, x_{\Omega_j(1)}, \ldots, x_{\Omega_j(n_j)})$ when all entries are fixed to the obtained values $b_{\Omega_j(k)}$ except for the considered neighbouring node Ndi.

The node Ndi updates its power correction according to the solution of $$\sum_{j \in \Omega_i} \varphi_{jiU}(b_i) + \varphi_{iiU}(b_i) = t_{iU}.$$

The function $\phi_{jiU}(x_i)$ can be computed at the node Ndj and transmitted to the node Ndi, and can be obtained by numerical computation, as well as the updated $b_i$ value.

In a variant of the invention, the above mentioned measurements are stored and the power correction computation is done based on the stored measurements in order to consider long term criterion.

At next step S410, the processor 200 commands the wireless interface 205 in order to apply the determiner power $b_i$ to each mobile terminal served by the node Ndi or to a selected subset of mobile terminals served by the node Ndi.

At next step S411, the processor 200 checks if there is an event for at least one mobile terminal MT served or previously served by the node Ndi. An event is for example, the power off of a mobile terminal MT or a handover of a mobile terminal or a power on of a mobile terminal MT or an establishment of a communication between a mobile terminal MT with a remote telecommunication device or a release of a communication between a mobile terminal MT with a remote telecommunication device.

If there is an event for at least one mobile terminal MT, the processor 200 moves to step S412. Otherwise, the processor 200 returns to step S402 already described in order to transfer the determined parameters.

At step S412, the processor 200 modifies the parameter $t_{iU}$.

For example, the processor 200 sets the parameter value $t_{iU}$ associated to each too old timestamp to a predetermined value. For example the parameter value $t_{iU}$ is set to a low value, for example at less than twenty of the maximal value the parameter value $t_{iU}$ can take or to null value.

After that, the processor 200 returns to step S302 already described in order to transfer the parameter t $t_{iU}$.

FIG. 5 discloses an algorithm executed by each node when the node will move into a state wherein the node can not serve mobile terminals.

More precisely, the present algorithm is executed by the processor 200 of each node Nd in parallel with the algorithms disclosed in FIGS. 3 and/or 4.

At step S500, the processor 200 detects the switching of the node Ndi, where i denotes the index of the node Ndi, in a power on state wherein the node Ndi is not able to serve a mobile terminal MT located in the cell CEHB of the node Ndi.

At next step S501, the processor 200 reads into the ROM memory a final parameter $t_{iD}$ value to be used by neighbouring nodes Nd for determining the power of the radio signals they transfer in their respective cell CEHB and/or a final parameter $t_{iU}$ value to be used by neighbouring nodes Nd for determining the power of the radio signals transferred by the mobile terminals MT served by the nodes Nd.

For example, the final parameter $t_{iD}$ value and/or the final parameter $t_{iU}$ value of the node Ndi is set to a low value, for example at less than twenty of the maximal value the parameter $t_{iD}$ and/or $t_{iU}$ can take or equal to null value.

At next step S502, the processor 200 commands the transfer of the parameter $t_{iD}$ and/or $t_{iU}$ value or values through the network interface 206.

For example, the processor 200 reads into the RAM memory 203, information identifying each neighbouring node Nd and commands the transfer of the parameter $t_{iD}$ and/or $t_{iU}$ value or values to each identified neighbouring node Nd through the backbone network and the network interface 206.

Naturally, many modifications can be made to the embodiments of the invention described above without departing from the scope of the present invention.

The invention claimed is:

1. A method comprising:
receiving, by a node from at least one neighbouring node in a wireless cellular telecommunication network, at least one parameter value used by the at least one neighbouring node for setting power of radio signals transferred by the at least one neighbouring node or for setting a power correction parameter of radio signals transferred by mobile terminals served by the at least one neighbouring node;
determining, from the at least one parameter value, a parameter value to be used by the node for setting power of radio signals transferred by the node or for setting a power correction parameter of radio signals transferred by mobile terminals served by the node;
setting the power of the radio signals transferred by the node or the power correction parameter of the radio signals transferred by the mobile terminals served by the node according to the determined parameter value;
transferring from the node to the at least one neighbouring node the determined parameter value when no change in mobile terminal(s) served by the node is detected; and
transferring from the node to the at least one neighbouring node a default value as the parameter value when a change in mobile terminal(s) served by the node is detected.

2. The method according to claim 1, wherein the node receives, from at least two neighbouring nodes, at least two corresponding parameter values used by the at least two neighbouring nodes for setting the power of the radio signals transferred by the at least two neighbouring nodes or for setting at least two corresponding power correction parameters of radio signals transferred by mobile terminals served by the at least two neighbouring nodes, and the parameter value to be used by the node for setting the power of the radio signals transferred by the node or for setting the power correction parameter of the radio signal transferred by the mobile terminals served by the node is determined based on the at least two parameter values.

3. The method according to claim 1, wherein the determined parameter value is inversely proportional of a sum of inverse of the received at least one parameter value of the at least one neighbouring node.

4. The method according to claim 3, wherein the method further comprises obtaining parameters on a link condition between the node, the at least one neighbouring node, and the mobile terminals served by the node, and the determined parameter value is dependent on the parameters on the link condition.

5. The method according to claim 4, wherein the link condition includes a path gain between the mobile terminal among the mobile terminals served by the node which has a worst signal to noise plus interference ratio with the node, and path gains between the at least one neighbouring node and the mobile terminal served by the node.

6. The method according to claim 5, wherein the power of the radio signals transferred by the node or the power correction parameter of the radio signals transferred by the mobile terminals served by the node is set according to the path gain between the mobile terminal among the mobile terminals served by the node which has the worst signal to noise plus interference ratio with the node and the path gains between the at least one neighbouring node and the mobile terminal served by the node or path gains between the mobile terminals served by the at least one neighbouring node with the node.

7. The method according to the claim 1, wherein the method further comprises, when the node moves into a state wherein at least one mobile terminal is served by the node, transferring to the at least one neighbouring node the default value as the parameter value.

8. The method according to claim 1, wherein the power of the radio signals transferred by the node or the power correction parameter of the radio signals transferred by the mobile terminals served by the node is set according to a worst signal interference plus noise ratio.

9. The method according to claim 1, wherein if one parameter value used by a neighbouring node is not received during a given period of time, the method further comprises setting the one parameter value to a null value.

10. The method according to claim 1, wherein the at least one parameter value and the parameter value to be used by the node are received and transferred through a backbone network linking the node and the at least one neighbouring node.

11. The method according to claim 1, wherein the at least one parameter value and the parameter value to be used by the node are received and transferred under a form of radio signals.

12. A device included in a node in a wireless cellular telecommunication network, the device comprises:

circuitry configured to receive, from at least one neighbouring node, at least one parameter value used by the at least one neighbouring node for setting the power of radio signals transferred by the at least one neighbouring node or for setting a power correction parameter of radio signals transferred by mobile terminals served by the at least one neighbouring node;

determine, from the at least one parameter value, a parameter value to be used by the node for setting power of radio signals transferred by the node or for setting a power correction parameter of radio signals transferred by mobile terminals served by the node;

set the power of the radio signals transferred by the node or the power correction parameter of the radio signals transferred by the mobile terminals served by the node according to the determined parameter value;

transfer from the node to the at least one neighbouring node the determined parameter value when no change in mobile terminal(s) served by the node is detected; and transfer from the node to the at least one neighbouring node a default value as the parameter value when a change in mobile terminal(s) served by the node is detected.

* * * * *